United States Patent [19]

Darves-Bornoz et al.

[11] Patent Number: 4,513,613
[45] Date of Patent: Apr. 30, 1985

[54] PARTICLE DETECTION SYSTEM

[75] Inventors: Yves Darves-Bornoz, LaGrangeville; George E. Melvin; Michael G. Ryan, both of Poughkeepsie; Dennis L. Saylor, LaGrangeville, all of N.Y.

[73] Assignee: International Business Machines Corporation, Armonk, N.Y.

[21] Appl. No.: 502,057

[22] Filed: Jun. 7, 1983

[51] Int. Cl.³ ............................................. G01N 19/08
[52] U.S. Cl. .................................... 73/159; 73/432 R
[58] Field of Search ................... 73/159, 432 G, 432 R

[56] References Cited

U.S. PATENT DOCUMENTS

| 3,037,381 | 6/1982 | Grant et al. | 73/159 |
|---|---|---|---|
| 3,470,739 | 10/1969 | Takafuji et al. | 73/159 |
| 3,502,827 | 3/1970 | Beebe | 73/159 X |
| 3,541,843 | 11/1970 | Flesher | 73/159 X |
| 3,553,668 | 1/1971 | Urmeryi | 73/159 X |
| 3,842,668 | 10/1974 | Lippke | 73/159 |
| 4,041,770 | 8/1977 | Staheli et al. | 73/159 X |
| 4,188,809 | 2/1980 | Ishimoto et al. | 73/159 X |
| 4,271,699 | 6/1981 | Williamson | 73/159 |
| 4,347,735 | 9/1982 | Desai et al. | 73/159 X |
| 4,443,278 | 4/1984 | Zingher | 73/159 X |

FOREIGN PATENT DOCUMENTS

| 1281721 | 10/1968 | Fed. Rep. of Germany | 73/159 |
|---|---|---|---|
| 2058101 | 6/1972 | Fed. Rep. of Germany | 73/159 |
| 2911649 | 9/1980 | Fed. Rep. of Germany | 73/159 |
| 195539 | 2/1983 | Japan | 73/159 |
| 1088871 | 10/1967 | United Kingdom | 73/159 |
| 2086588 | 5/1982 | United Kingdom | 73/159 |

OTHER PUBLICATIONS

IBM Technical Disclosure Bulletin, vol. 9, No. 9, 2-1967, p. 1089, V. W. Coffin.
"Applying a Protective Coating on Components"; IBM Technical Disclosure Bulletin, vol. 12, No. 11, Apr. 1970, p. 1767, E. C. Spaulding et al.
"Manual Inspection Technique for Surface Potrusions", IBM TDB, vol. 12, No. 11, Apr. 1970, p. 1897, R. R. Garnache.
"Checking Disk Surfaces" IBM TDB, vol. 14, No. 7, Dec. 1971, p. 2130, R. Pascual.
"Pinhead and Pin Shear Planarity Measurer", IBM TDB, vol. 20, No. 8, Jan. 1978, pp. 3050-3051, J. L. Sirico.
"Greensheet-Flettering Mechanism for Use in Manufacturing of Multilayer Ceramic Products", IBM TDB, vol. 23, No. 4, pp. 1333-1334, Sep. 1980, G. T. Davis et al.
"Oversized-Pin Head Detector Gage System" IBM-TDB, vol. 23, No. 5, p. 1853, Oct. 1980, T. R. Homa et al.

Primary Examiner—Jerry W. Myracle
Assistant Examiner—Tom Noland
Attorney, Agent, or Firm—Sughrue, Mion, Zinn, Macpeak and Seas

[57] ABSTRACT

An inspection system for detecting the presence of debris on ceramic green sheets prior to screening. The sheets are deposited on a planar stage using a pick-up head. The pick-up head carries a sensor to determine whether or not debris adhering to the head, the sheet or the stage is presenting a non-planar sheet surface.

13 Claims, 6 Drawing Figures

PARTICLE DETECTION SYSTEM

BACKGROUND OF THE INVENTION

1. Field of the Invention

This invention relates to a system for detecting particulate contaminants associated with ceramic sheets during processing in the manufacture of integrated circuit modules.

2. Prior Art

In the manufacture of integrated circuit modules, unfired ceramic sheets (green sheets) are subjected to a variety of processing techniques, such as blanking, punching, screening with a conductive paste and stacking into multilayer modules. The green sheets are generally flexible and soft until fired. They have a propensity to carry with them particulate contaminants, typically ceramic debris, which tend to adhere to their soft surfaces. These contaminants are carried with the green sheets from station to station since handling is generally by vacuum pick-up or Bernouilli techniques. Thus, at those stations where debris is likely to be created, such as in blanking and punching of the green sheet material, it is difficult to eliminate all contaminants when the sheets are moved to the next processing station.

The existence of these contaminants is especially severe during processing to screen a conductive paste pattern on the green sheet. During this process step, a thin mask is placed over the green sheet wafer for the purpose of screening a highly complex and fine pattern of conductive lines. The presence of such contaminants has a twofold effect. First, they cause dents in the mask during screening resulting in the destruction of the mask and poor screened pattern dimensional control. In the formation of integrated circuit modules, layers of green sheets are stacked to define a multi-layer ceramic module. Alignment from layer to layer is crucial and the existence of a dent caused by a particle destroys the conductive alignment in the mask which is used to screen conductive paste on that respective green sheet. This expensive mask must be discarded.

Secondly, the presence of a contaminant inhibits effective screening of the conductive pattern. In the absence of a test to determine whether particles are present, screening takes place and it is only in subsequent quality control steps that the accuracy of the screening procedure is determined. Should the screening be defective, the sheets are generally unusable. Thus, in addition to destroying the mask, defective green sheets are produced.

Within the prior art, there is general recognition of the problem of damage which occurs to screening masks by particles associated with green ceramic sheets. For example, IBM TDB, Vol. 23, No. 4, pp. 1333-1334 aligns green sheets onto an alignment fixture and then utilizes the input transfer head, typically a vacuum device to press the green sheet, that is, flatten it, on the alignment fixture. This techniqu e tends to embed any particles and flatten any icicle-like projections which may exist on the surface of the green sheet into the green sheet body per se. Thus, there is no attempt to sense the presence of contaminants but rather this technique proceeds on the assumption that such are present in all green sheets and simply performs a flattening operation. This technique, therefore, embeds contaminants into the green sheet. This leads to the propensity of making it difficult to lift the green sheet off the alignment fixture since it is pressed into position. Finally, this technique adds an increment of processing time into the overall system since the transfer head which is normally used to simply move green sheets from one station to another must remain at a particular station for the purpose of performing the flattening operation.

IBM TDB, Vol. 12, No. 11, page 1897, April, 1970 disclosed an optical inspection technique for detecting surface protrusions on semiconductor wafers. A blank mask is lowered onto the surface of the wafer and a vacuum is then applied. If protrusions are present, strains will be set up in the mask on the wafer surface. When viewed through an analyzer using polarized light, such protrusions are displayed as bright spots on a uniform field. This manual inspection technique is therefore premised on operator judgment such as the number and size of the observed spots and allows for the rejection of wafers considered harmful to the screening masks without actually employing those screening masks or damaging any test mask. Such an optical inspection technique is usable in the context of large size particles but would not be effective in the context of particles having sizes in the range of 1-2 mils. An optical system is also subjective, based on operator judgment and is relatively time-consuming.

Within the prior art, other techniques are known for determining imperfections which exist on surfaces. For example, IBM TDB, Vol. 14, No. 7, page 2130, December, 1971 checks for imperfections on magnetic recording discs by utilizing a thin copper film pad. This pad is placed on a checking head which moves systematically over the disc surface so that the copper rubs the surface. Projections on the surface will scratch the copper which can then be subsequently inspected utilizing an interference microscope. The profile of scratches obtained provides a measure of the size of surface imperfections. Such a system relies on optical checking and is relatively time-consuming since the entire surface must be scanned. The system also requires additional processing structure in the form of a checking head and off-line inspection. Techniques are also known to determine the planarity of workpieces such as the detection of oversize pinheads of a multiple pin carrier are disclosed in IBM TDM, Vol. 25, No. 5, page 1853, October, 1980. Pinhead planarity is detected in IBM TDM, Vol. 20, No. 8, page 3050, January, 1978.

SUMMARY OF INVENTION

Given the deficiencies of the prior art, it is therefore a requirement to define a system which is operative in an on-line manner to detect the presence of particles or other types of particulate contaminants which exist on green sheets prior to screening. Such a test system is required to prevent damage to the masks and to allow green sheets to be recycled, that is, cleaned, prior to screening. By removing such green sheets from the process line, the usable life of each screening mask would be materially enhanced. Given high system throughput and the cost of each individual mask, prolonging usable mask life represents a significant improvement.

By defining a particle detection system which can be incorporated within existing tools, overall system throughput is maintained. That is, off-line processing either manually or by the use of separate off-line tools is avoided.

Additionally, defective sheets may be cleaned and rescreened. Thus, the detection of defective defects occurs at a point in time where the green sheets are not subject to processing steps which, if improperly applied, would render that sheet unusable.

It is therefore an object of this invention to define a particle detection system which can be incorporated in an on-line manner to sense the presence of particles or other particulate contaminants on a green sheet.

Yet another object of this invention is to provide a system that identifies ceramic debris or other particular contaminants which damage screening masks prior to the step of screening a green sheet.

A further object of this invention is to define a particle detection system that enhances the life of a screening mask by removing green sheets carrying particles prior to the screening of a conductive paste using such masks.

Yet another object of this invention is to define a particle detection system which is usable in an on-line environment to identify defective ceramic sheets at various stages of processing, such as blanking, punching, and stacking.

These and other objects of this invention are attained by the use of an inspection system that detects the presence of particles, generally ceramic debris, on an unfired ceramic sheet prior to screening. Such sheets are deposited onto a stage by means of a pick-up head and a mask is subsequently applied so that a conductive pattern can be screened onto the green sheet corresponding to the pattern on the mask. In accordance with this invention, transducers are placed on the pick-up head to determine the presence of contaminants.

In one preferred embodiment of the invention, a proximity detector is utilized, for example, an air gauge or LVDT to measure the effective distance between the pick-up head surface and the top of the green sheet. If a particle is present, the distance will vary providing a positive indication that contaminants exist on the green sheet.

In accordance with another embodiment of the invention, a spring-loaded plate is used as a part of the pick-up head and transducers are mounted in the head itself. Movement of the spring-loaded plate from a predetermined position is detected by means of a proximity sensor. Such movement provides a positive indication of the presence of contaminants.

In yet another embodiment of this invention, the transducer mounted on the pick-up head senses movement of alignment pins which are used to accurately fix the green sheet on the stage. Such movement provides an indication of the presence of a contaminant material carried by the green sheet to the screening stage.

This invention will be defined in greater detail by referring to the attached drawings and the description of the preferred embodiments that follow.

BRIEF DESCRIPTION OF THE DRAWINGS

FIG. 1A illustrates the debris detector prior to contacting the green sheet nest assembly, FIG. 1B shows the set position with no debris present, FIG. 1C shows the condition of sensing debris within the active area on the green sheet, and FIG. 1D shows the sensing of active debris on the inactive area;

Figure 1A:
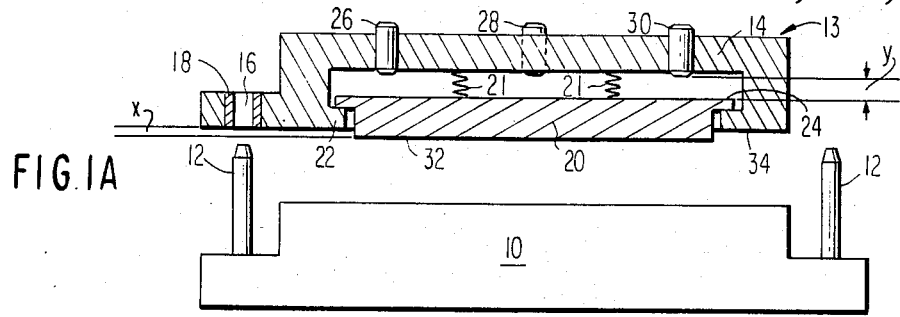
FIGS. 1A–1D is a schematic elevation drawing showing a first preferred embodiment of this invention, in particular.

This invention will be described in greater detail by referring to the description of the preferred embodiments when taken with the drawing.

DESCRIPTION OF THE PREFERRED EMBODIMENTS

Referring now to FIGS. 1A–1D, a first preferred embodiment of this invention is shown. As set forth herein, an important function of this invention is to determine the presence of particles which adhere to either the pick-up head or nest surfaces which would result in either damage to screening masks or result in defective screening. FIG. 1A–1D illustrates a situation where debris is carried by the green sheet. It is understood, however, that the embodiment is equally applicable to determine the presence of debris which exists on the nest assembly.

As shown in FIG. 1A, a nest assembly 10 generally comprises a fixture having head and mask location pins 12. While two such pins are shown, it is understood that any number can be used to achieve accurate alignment of the system. The nest assembly 10, as shown in FIG. 1A, is used as an operation point in the processing of green sheets. Thus, a pick-up head assembly 13 is used to move green sheets between processing stations. The pick-up head assembly 13 may use vacuum or Bernouilli principles to lift, support, and transfer a green sheet from one assembly to another for processing. The pick-up head assembly comprises a yoke 14 having channeled therein alignment holes 16 suitably sleeved by a sleeve member 18 to reduce friction and provide accurate alignment of the assembly 13, vis-a-vis the pins 12. In accordance with the present invention, the pick-up head assembly 13 comprises a first yoke member 14 and a plate sensor 20. The yoke 14 has an inwardly directing flange 22 which supports a compatible outwardly extending flange member 24 on the plate 20. A series of proximity sensors 26, 28, and 30 are disposed on the yoke 14. The sensors 26, 28 and 30 are used to determine the relative position of the plate 20 to the yoke 14. While three sensors are shown, it is apparent that any number can be used so long as the relative position of the plate 20 can be ascertained. As shown in FIG. 1A, the lower surface 32 of the plate 20 protrudes by a distance X from the lower surface 34 of the member 18 when the flange portions 22 and 24 are in an abutting relationship.

Figure 1B:
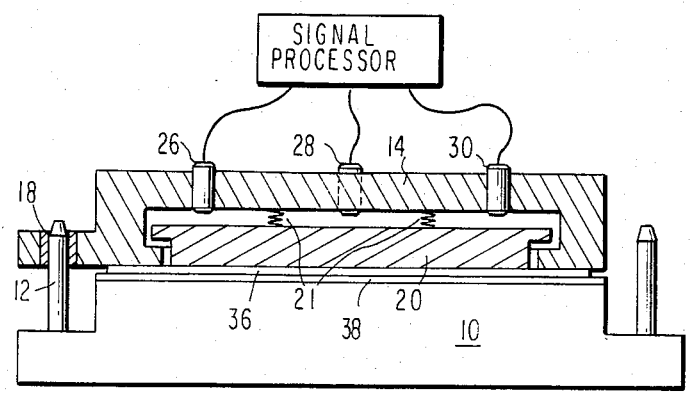

FIG. 1B illustrates the sensor set position where no debris is present. In particular, on the nest assembly 10, a green sheet 36 is disposed and supported by a film material 38. The green sheet 36 contains a multitude of thru-holes (vias) and the film material 38 prevents the screened on paste from permeating through the vias onto the remainder of the nest. This impermeable film material can be "Kimdura" or another commercially available film. With the green sheet 36 positioned on the film 38, if no debris is present, then the plate 20 will rest uniformly upon the green sheet 36. The sensors 26, 28, and 30 will therefore be disposed a uniform distance (Y) above the plate. Stated differently, there will be no variation in dimension Y between the upper surface of the plate 20 and any of the sensors shown in FIG. 1B. The springs are slightly compressed and the surface 32 is level with surface 34 on the yoke.

Figure 1C:
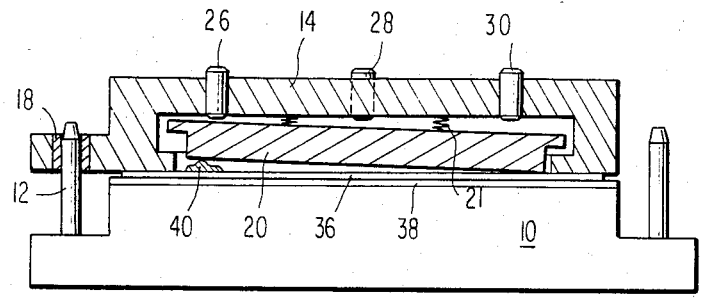
Figure 1D:
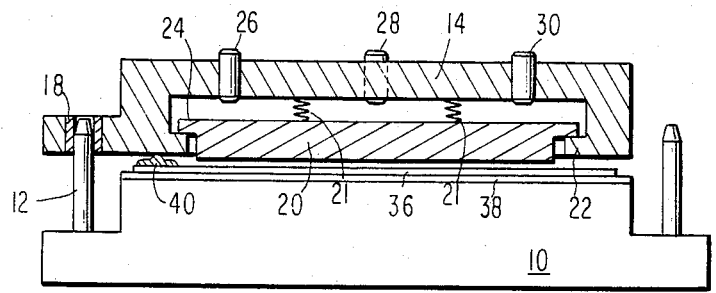

Consider now the situation where debris is present on the active area of the green sheet 36. Such is shown in FIG. 1C with a particle schematically shown as element 40. The active areas is defined as that portion of the green sheet which will be subjected to processing, that is, screening operations or the like to define conductive lines in a layer a MLC. If debris is present, then, as shown in FIG. 1C, the plate 20 will be displaced upward in the vicinity of the debris. The sensor set dimensions Y will not be maintained such that a variation in output will exist between sensor 28 and sensor 30. This output would be used to indicate that the green sheet 36 should be lifted by the pick-up head 14 for cleaning and recycling into the system.

The embodiment of FIG. 1 is also capable of sensing the presence of debris in the inactive area. As shown in FIG. 1D, a particle of debris 40 is shown on the green sheet 36 in the region where the pick-up head operates, that is, outside the area for active processing. As shown in FIG. 1D, the yoke 14 surface 34 directly contacts the debris 40 on the green sheet 36. The plate 20 remains in contact with member 14, that is, flanges 22 and 24 in an abutting relationship. Also, the sensor set dimension, is maintained such that uniform outputs in the sensors 26, 28, and 30 is attained. However, a pick-up head reference point will not be achieved. That is, in such systems the movement of the pick-up head is accurately monitored during transport operations such that the distance from the lower surface 34 to the upper surface of the green sheet 36 is known. As the pick-up head engages pin 12 and is lowered orthogonal to the surface of the green sheet 36, downward movement is ultimately inhibited by the presence of debris 40. Motion of the transfer head mechanism then stops and it is ascertained by the system controller (not shown) that lowering to the reference point has not been achieved. The presence of debris in the inactive area is therefore positively ascertained because the sensor set dimension is a given output not achieved, irrespective of the sensors 26, 28, and 30, providing uniform outputs.

This first preferred embodiment of the invention illustrates situations where particles of debris are present on the surface of the green sheet 36. It is however, apparent that the invention will also work to detect the presence of a particle which is carried by the nest surfaces, that is, between the Kimdura layer 38 and the green sheet 36 which is deposited for screening. If a particle is present between layers 36 and 38, the same displacement of the sensor plate 20 will occur if the particle is within the active area. Inability of the transfer head to lower to the set point will also occur if the particle is located in the inactive area.

The first preferred embodiment of FIG. 1A–1D can use a variety of different transducers. For example, air gauges, LVDT, mechanical or other proximity sensors can be used. It is apparent that contact or non-contact type of sensors may be employed. Transducer output would conventionally be processed via conventional signal processing techniques associated with pick-up head reference point, and sensor outputs as a function of the sensor set dimension Y.

The embodiment of FIG. 1 can also be modified by, if necessary, placing the transducers directly in the sensor plate 20. In this modification, sensing movement of the plate 20 is not utilized but rather the transducer measures directly the distance between its lower surface 32 on the plate and the upper surface on the green sheet 36.

Damping of the plate 20 is achieved, by spring loading the plate relative to the yoke member 14. By spring loading the plate 20 with spring 21, a given dynamic load is placed on the plate preventing short term perturbations as the transfer head moves. It is apparent however that the spring 21 need not be used. The plate would simply ride on the flanges 22 unless displaced by debris.

Figure 2:
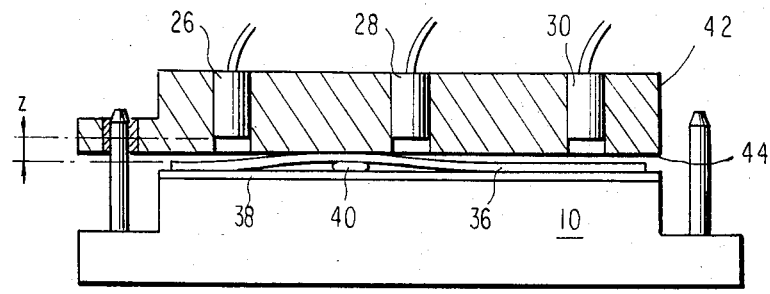
FIG. 2 illustrates a second preferred embodiment of this invention utilizing transducers placed directly on the pick-up head without using a plate sensor.

A second preferred embodiment of this invention is shown in FIG. 2 wherein like components are given the same numbering as in FIG. 1. For purposes of simplification, the head and mask location alignment pins of the first embodiment are deleted. This embodiment illustrates the situation where a particle 40 is disposed between the film material 38 and the green sheet 36. It is, however, understood that the embodiment is equally implemented in a situation where the particle is located on the top surface of the green sheet 36 or carried by the pick-up head 42.

The pick-up head 42 of the embodiment of FIG. 2 varies from that shown in FIG. 1 in that plate 20 is deleted and the transducers 26 are directly placed in the pick-up head and recessed from its lower surface 44. Recessing avoids contact of the transducers with the soft green sheet material 36. The sensor set dimension Z is therefore determined as existing between the lower surface of the transducer 26 and the upper surface of the green sheet 36. By measuring this distance from a plurality of sensors, variations indicate the presence of particles.

As shown in FIG. 2, the green sheet material will flex given the presence of a particle 40. Thus, at the outer periphery in the vicinity of sensor 26, the sensor set point dimension Y is maintained. However, in the vicinity of the particle 40, a virtual flush relationship exists since that is the point of contact between the pick-up head and the green sheet. Thus, the output of sensor 28 will vary from the dimension Z indicating the presence of a particle. Given this condition, the green sheet would be removed for recycling or the nest surfaces would be cleaned prior to the subsequent deposit of a new green sheet 36. As in the case of the first embodiment, a variety of sensors of either the contact or non-contact type may be used.

Figure 3:
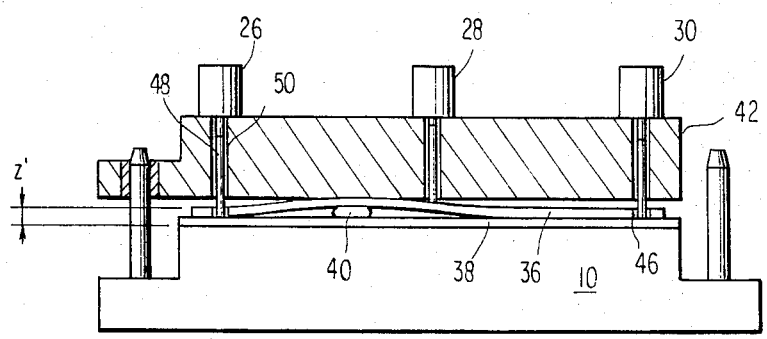
FIG. 3 is a schematic sectional view showing a third preferred embodiment of this invention utilizing the position of stack alignment pins to detect the presence of debris within the active area.

A third preferred embodiment is shown in FIG. 3. This third preferred embodiment departs from the first two embodiments in the sense that an indirect transducer measurement is utilized. In the processing of green sheets, pins are used to align via holes 46 which are punched into the green sheet 36. The via holes in one sheet and another are then aligned utilizing an array of pins 48 protruding through the via holes to provide alignment of the green sheet for masking.

In this embodiment, the pick-up head 42 is modified to have a series of thru-holes 50 each receiving a stack alignment pin 48. The transducers 26, 28, and 30 are displaced to the top portion of the pick-up head directly overlying each of the thru-holes 50. The pins will pass through the holes 50, through the hole 46 in the green sheet, and contact the top of the film material 38. The respective thicknesses of the green sheet and the film material 38 are known dimensions shown in FIG. 3 as dimension Z'. Thus, the output from transducers 26 and 30 would be constant representing the distance Z'. However, if a particle is shown, for example, at position 40, the green sheet 36 is displaced upward. A flush relationship is maintained therebetween a lower portion of the pick-up head 42 and the upper portion of the green sheet 36. Thus, a variation in the dimension of the distance from the surface of the green sheet to the top of the nest 10 will vary from sensor to sensor. This will be reflected by a difference in the degree of penetration of the pins 48. The variation in output between sensors 26, 28 and 30 will therefore indicate the presence of particle 40.

As is apparent from the other preferred embodiments of this invention, the embodiment of FIG. 3 is also capable of measuring the presence of debris adhering to either the bottom surface of the pick-up head 42 or on the top of the green sheet 36. In this situation, the pick-up head will not uniformly contact the green sheet but rather will contact first the debris 40, again causing a variation in the sensed dimension.

In accordance with the present invention, the determination of particles which will damage a screening mask is made prior to placing the mask on the green sheet. That is, in all of the embodiments of the present invention, the transfer head itself is used to determine the presence of particles which exist at a particular station prior to having the mask placed on top of the green sheet for the screening operation. In the case of particles which adhere to the green sheets, those sheets are simply removed for cleaning and subsequent screening. In the case of particles which adhere to the pick-up head or the nest surfaces, the presence of repeated particle warnings would necessitate that the stage be shut down for cleaning.

While the present invention has been described relative to a pick-up head used at a screening station, it is apparent that the technique can be used wherever a pick-up head is employed. Thus, defective ceramic sheets can be identified in other processing areas, such as blanking, punching, and stacking, utilizing the same sensor techniques as embodied in the pick-up head assembly.

While the invention has been described relative to the three preferred embodiments herein, it is apparent that other modifications may be practiced by those having working skill within this technology without departing from the essential scope of this invention.

We claim:

1. A system for detecting the presence of a contaminant that influences the planarity of a sheet comprising:
   a stage having a surface for supporting said sheet;
   a movable pick-up head having a surface conforming to the surface on said stage, said pick-up head movable into and out of position over said stage to deposit onto and remove said sheet from said stage;
   means on said head to sense whether or not said surface on said head is in uniform contacting engagement with said sheet supported by said stage; and
   means receiving the output of said sensor means to determine whether or not said contacting engagement is achieved.

2. The system of claim 1, wherein said pick-up head comprises a yoke assembly and a sensor plate disposed for movement relative to said yoke assembly when a contaminant is present in a predetermined area.

3. The system of claim 2, wherein said sensor means is mounted on said yoke assembly, said sensor means sensing the distance between a top surface of said sensor plate and said sensor means.

4. The system of claim 3, wherein said sensor means comprises a plurality of transducers positioned on said yoke to determine upward displacement of said sensor plate from said yoke assembly.

5. The system of claim 2 further comprising means to elastically couple said sensor plate to said yoke assembly.

6. The system of claim 1, wherein said sensor means comprises a plurality of transducers positioned in said pickup head and recessed from said conforming surface on said head.

7. The system of claim 1, wherein said pick-up head has a plurality of thru-holes, said sensor means comprises a plurality of transducers positioned on said pick-up head over said thru-holes, alignment pins projecting from said thru-holes to the surface of said sheet material and said transducers measuring the penetration of said alignment pins in said thruholes.

8. The system of claim 1, wherein said sheet is a flexible unfired thin ceramic sheet.

9. The system of claim 1, wherein said stage further comprises pick-up head alignment posts and said pick-up head further comprises a series of holes aligned with said alignment posts.

10. A method of detecting irregularities on a sheet that would influence its planarity comprising:
    moving said sheet onto a stage using a pick-up head that holds said sheet and places it onto a surface of said stage having planarity with a surface of said pick-up head;
    sensing any variations in the distance between said sheet and said planar surface on said pick-up head while said sheet rests on said stage planar surface; and
    determining, based on said distance sensing, whether uniform contacting engagement exists between said sheet and said picl-up head.

11. The method of claim 10, wherein said pick-up head comprises a yoke assembly and a sensor plate disposed for movement relative to said yoke assembly and, said step of sensing determines whether there are any variations between said sheet and said sensor plate.

12. The method of claim 11, wherein said sensors are placed on said yoke assembly and, said step of sensing determines whether or not said sensor plate has been displaced from said yoke assembly.

13. The method of claim 10 further comprising the step of aligning said pick-up head on said stage when said sheet is deposited onto said stage.

* * * * *